United States Patent [19]

Sorkin

[11] Patent Number: 4,896,470

[45] Date of Patent: Jan. 30, 1990

[54] TENDON TENSIONING ANCHOR

[75] Inventor: Felix L. Sorkin, Houston, Tex.

[73] Assignee: Varitech Industries, Inc., Stafford, Tex.

[21] Appl. No.: 184,535

[22] Filed: Apr. 21, 1988

[51] Int. Cl.⁴ .......................... E04C 5/12; E04C 3/26
[52] U.S. Cl. ...................................... 52/230; 52/223 L
[58] Field of Search .................. 52/230, 223 L, 223 R

[56] References Cited

U.S. PATENT DOCUMENTS

| | | | |
|---|---|---|---|
| 3,399,434 | 9/1968 | Kelly | 52/230 |
| 4,348,844 | 9/1982 | Schupack et al. | 52/230 |
| 4,368,607 | 1/1983 | Boonman | 52/230 |
| 4,561,226 | 12/1985 | Tourneur | 52/223 L |
| 4,616,458 | 10/1986 | Davis et al. | 52/230 |
| 4,719,658 | 1/1988 | Kriofske | 52/230 |

FOREIGN PATENT DOCUMENTS

| | | | |
|---|---|---|---|
| 775744 | 5/1957 | United Kingdom | 52/230 |
| 2169013 | 7/1986 | United Kingdom | 52/223 L |

Primary Examiner—Michael Safavi
Attorney, Agent, or Firm—Harrison & Egbert

[57] ABSTRACT

A tendon tensioning anchor comprising a base member with a tubular section extending therefrom and a plastic encapsulation in air-tight juxtaposition with the exterior of the base member and the exterior of the tubular section. The plastic encapsulation opens at the end of the tubular section opposite the base member. A tubular portion is formed at the side of the base member opposite the tubular section. This extends outwardly perpendicular to the base member and has a diameter sufficient for receiving a tendon. A receiving area is formed adjacent the end of the tubular section and extends outwardly therefrom so as to receive a sealing cap. The plastic enclosure comprises high density polyethylene in an injection-molded relationship with the base member and the tubular section. The plastic enclosure is of unitary construction and in an electrolytic relation with a tendon extending therethrough. A plurality of reinforcing rib members extend outwardly from th exterior of the tubular section to the base member. The plastic encapsulation surrounds the reinforcing rib members in air-tight juxtaposition.

12 Claims, 4 Drawing Sheets

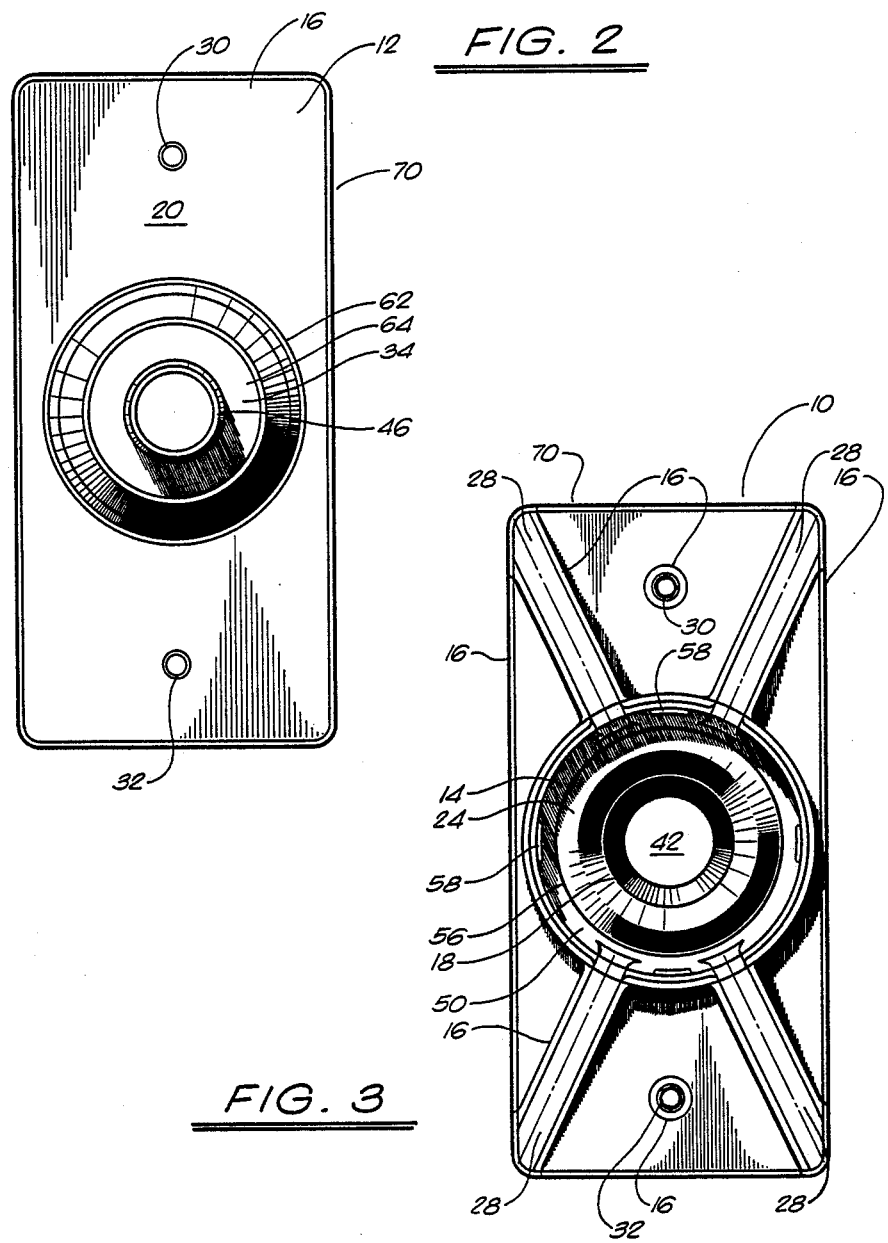

4,896,470

TENDON TENSIONING ANCHOR

TECHNICAL FIELD

The present invention relates to tendon tensioning anchor assemblies in general. More particularly, the present invention relates to anchors having surfaces for protecting the anchor from corrosion and exposure. In addition, the present invention relates to methods for forming such anchor assemblies.

BACKGROUND ART

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive (vertical) load, is extremely weak in carrying significant tensile loads. It becomes necessary, therefore, to add steel bars, called reinforcements, to concrete, thus allowing the concrete to carry the compressive forces and the steel to carry the tensile (horizontal) forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as 100 feet can be attained in members as deep as three feet for roof loads. The basic principal is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principal, but the reinforcing is held loosely in place while the concrete is placed around it. The reinforcing is then stretched by hydraulic jacks and securely anchored into place. Pre-stressing is done with individual members in the shop and post-tensioning as part of the structure on the site.

In a typical tendon tensioning anchor assembly in such post-tensioning operations, there is provided a pair of anchors for anchoring the ends of the tendons suspended therebetween. In the course of installing the tendon tensioning anchor assembly in a concrete structure, a hydraulic jack or the like is releasably attached to one of the exposed ends of the tendon for applying a predetermined amount of tension to the tendon. When the desired amount of tension is applied to the tendon, wedges, threaded nuts, or the like, are used to capture the tendon and, as the jack is removed from the tendon, to prevent its relaxation and hold it in its stressed condition.

Metallic components within concrete structures may become exposed to many corrosive elements, such as de-icing chemicals, sea water, brackish water, or spray from these sources, as well as salt water. If this occurs, and the exposed portions of the anchor suffer corrosion, then the anchor may become weakened due to this corrosion. The deterioration of the anchor can cause the tendons to slip, thereby losing the compressive effects on the structure, or the anchor can fracture. In addition, the large volume of byproducts from the corrosive reaction is often sufficient to fracture the surrounding structure. These elements and problems can be sufficient so as to cause a premature failure of the post-tensioning system and a deterioration of the structure.

Several U.S. patents have considered the problem of anchor and tendon corrosion. U.S. Pat. No. 4,348,844, issued to Morris Schupack et al., on Sept. 14, 1982, disclosed a tendon assembly in which a tendon is enclosed in a sheath suspended under tension between two spaced anchor members. The anchor members are entirely enclosed within an envelope or a housing. The sheath, the envelope, and the housing are required to comprise electrically non-conductive materials for electrically isolating the tendon and anchor members from a surrounding concrete structure to thereby prevent the effects of electrolysis caused by electrical currents.

After experimentation and study, it has been found that electrolytic actions, described in detail in the Schupack patent, have little or no deteriorating effect on the anchor assembly. There are occasions in which the electrolytic action created by currents passing through the tendon to the anchor assembly has been found to be beneficial. For instance, when anodic material is placed in electrical connection with such electrically conductive anchor assembly. In this situation, the anodic material to the structural strength and stability of the cathodic anchor assembly.

U.S. Pat. No. 4,616,458, issued to Davis et al., on Oct. 14, 1986, provided a plastic structure for protecting the anchor assembly and the ends of a tendon from exposure to the corrosive elements. The system of this patent describes a protective top member and a protective bottom member. The anchor was interposed between these members, the members were snap-fitted together, and the anchor locked into position between these protective members. Grease was then injected into the interior between these protective plastic members so as to seal the anchor from the corrosive water in the environment. A grease cap would be threaded onto the protective top member so as to allow grease to be injected into the interior space.

In practice, the device of the Davis patent required extensive manipulation of the top and bottom members so as to allow the snap-fit to occur. It also required the difficult manipulation of fitting the anchor within this assembly. Finally, the step of injecting grease into the interior was required following assembly. It was found that many man-hours were consumed in the assembly and manipulation steps. On occasion, assembly procedures allowed grease to leak from the interior between the top and bottom members.

It is an object of the present invention to provide a tendon tensioning anchor that effectively seals the exterior of the anchor from the exterior environment.

It is another object of the present invention to provide a tendon tensioning anchor that allows electrolytic effects to occur between the tendon and the interior of the anchor.

It is a further object of the present invention to provide a tendon tensioning anchor that has a protective covering which needs no assembly, manipulation, or effects a waste of manpower.

It is still a further object of the present invention to provide a tendon tensioning anchor that effects a superior seal between the exterior of the anchor and the exterior environment.

These and other objects and advantages of the present invention will become apparent from a reading of the attached specification and appended claims.

BRIEF DESCRIPTION OF THE DRAWINGS

FIG. 2 is a right-side view of the anchor shown in FIG. 1.

FIG. 3 is a left-side view of the anchor shown in FIG. 1.

DETAILED DESCRIPTION OF THE INVENTION

Figure 1:
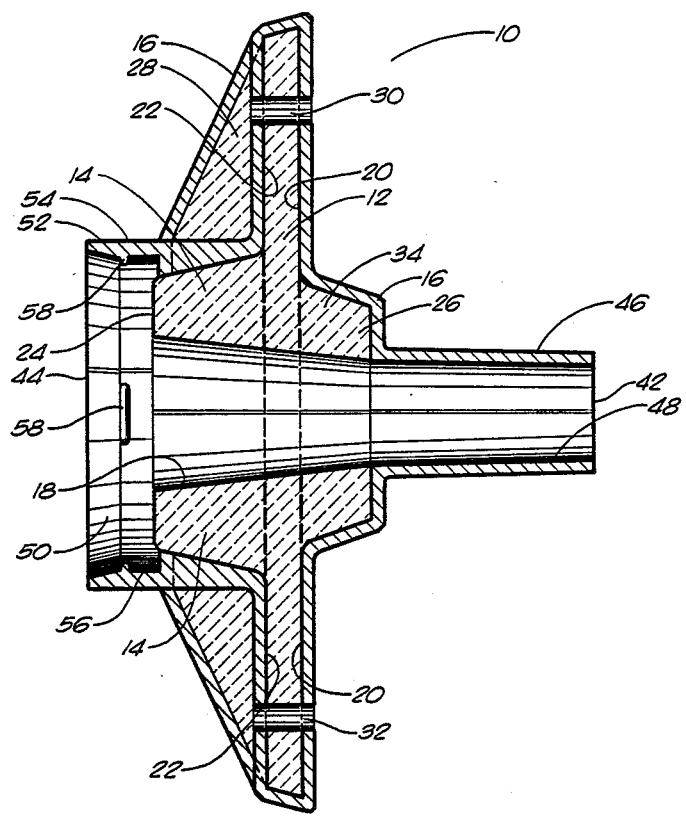
FIG. 1 is a cross-sectional view showing an anchor in accordance with the preferred embodiment of the present invention.

Referring to FIG. 1, there is shown at 10 the tendon tensioning anchor in accordance with the preferred embodiment of the present invention. Tendon tensioning anchor 10 comprises a base member 12 having a tubular section 14 extending therefrom and a plastic encapsulation 16 in generally air-tight juxtaposition with the exterior surface of the base member 12 and tubular section 14. Tubular section 14 has a sloping annular interior wall 18 for receiving the end of a tendon and for receiving the wedges for fixing the position of the tendon.

As shown in FIG. 1, the base member 12 is a relatively standard anchor used for the tensioning of tendons in post-tension construction. The tubular section 14 extends outwardly in a tapered manner from the planar surface 22 of base member 12. Tubular section 14 has an outer end face 24. The sloping annular interior wall 18 is a rather large opening that has its widest diameter at end surface 24. The sloping interior wall 18 has a constant taper through the anchor 12 to the other side end face 26.

A plurality of reinforcing rib members 28 extend outwardly from the exterior of tubular section 14 to the planar surface 22 of base member 12. These reinforcing rib members add structural strength to the anchor 12. These reinforcing rib members 24 extend outwardly radially to the outer edge of the base member 12.

A pair of holes 30 and 32 are formed through the thickness of the base member 12 such that the hole opens on each of the planar faces 20 and 22. These holes are for temporarily attaching the anchor to a structure under construction.

A transition structure 34 is formed on the side of the base member 12 opposite the tubular section 14. This transition structure 34 tapers from base member 12 toward the end surface 26. This transition structure 34 has a narrowing interior bore that is concentric with the interior wall of the base member 12 and the tubular section 14. It should be noted that such transition structure 34 may be present or may not be in typical anchor assemblies. This should not be construed as a limitation on the present invention.

It can be seen in FIG. 1 that a plastic encapsulation 16 is juxtaposed to the exterior of the base member 12, the exterior of the tubular section 14, the exterior of the transition structure 34, and across the reinforcing rib member 16. This plastic encapsulation 16 opens at the end 24 of the tubular section 14. The plastic encapsulation 16 opens so as to expose the sloping annular interior wall 18 of the anchor 12. The plastic encapsulation 16 is made up of a high-density polyethylene which is injected molded so as to generally surround the anchor 12. The plastic encapsulation 16 is of unitary construction. As can be seen, the plastic encapsulation 16 opens at end 42 and at end 44 of the tendon tensioning anchor 10. The opening at 42 permits electrolytic action between a to-be-inserted tendon and the anchor 12.

The plastic encapsulation 16 includes a tubular member 46 formed at the side of the base member 12 opposite the tubular section 14 of the anchor. Tubular portion 46 extends outwardly perpendicular to this base member 12. The inner diameter 48 of tubular portion 46 should be sufficient so as to allow a tendon to pass therethrough. It can be seen that the inner diameter 48 of the tubular portion 46 of the plastic encapsulation 16 matches and is in close juxtaposition with the narrow diameter of the sloping interior wall 18 of the anchor 12. The inner diameter 48 may also have a sufficient width to accommodate any sheaths or protective coatings extending around the exterior of such tendons.

The plastic encapsulation 16 further includes the sealing of the interior walls of the holes 30 and 32. It can be seen that holes 30 and 32 open through the plastic encapsulation 16 at the planar faces 20 and 22 of the base member 12. The plastic encapsulation seals the interior wall of these holes so as to prevent corrosive materials from leaching into these holes and thus corroding the anchor 12. Functionally, the holes still operate so as to allow nails, screws, or other fasteners to attach the anchor assembly 10 to an exterior surface. Importantly, however, the metallic walls of the holes are sealed by the plastic encapsulation envisioned by the present invention.

A receiving area 50 is formed adjacent the end 24 of the tubular section 14. This receiving area 50 extends outwardly from the end 24. In operation, receiving area 50 acts to receive and fix sealing caps thereto. The receiving area 50 comprises a cylindrical portion 52 extending outwardly from the exterior surface 54 of the plastic encapsulation surrounding the tubular section 14. An annular lip 56 extends inwardly from the inner wall 58 of the cylindrical portion 54. This lip 56 is in sealing relationship with the end 24 of the tubular section 14. A detent 58 is formed on the inner wall 58 of the cylindrical portion 54. Detent 58 is located in several locations in a single plane within the interior wall 58. Detent 58 serves to receive a lip of a sealing cap inserted thereto.

FIG. 2 is a right-side view of the tendon tensioning anchor 10 of the present invention. As can be seen from the view of FIG. 2, the plastic encapsulation 16 covers the entire surface as viewed in FIG. 2. The planar face 20 of the base member 12 is shown as having a rather rectangular configuration. The holes 30 and 32 open to the face 20 of the base member 12. Extending toward the viewer and outwardly from the planar surface 20 of base member 12 is the transition structure 34. In combination with the view of FIG. 1, it can be seen that the transition structure 34 has a circular junction 62 with the planar face 20. From this junction, the transition section 34 tapers downwardly toward an annular portion 64. Annular portion 64 is in plane parallel with the face 20 and has a circular configuration. The tubular portion 46 extends toward the viewer outwardly from the inner diameter of the annular portion 64.

FIG. 3 is a left-side view of the anchor 10 of FIG. 1. In FIG. 3, it can be seen that the reinforcing rib members 28 extend outwardly radially from the tubular section 14 toward the outer edges 70 of the anchor 10. It can also be seen that the plastic encapsulation 16 surrounds and covers each of these rib members 28. The holes 30 and 32 are shown as opening to the exterior surface from the base member 12. The plastic encapsulation 16, around the original holes 30 and 32, is also shown. The receiving area 50 has a circular configuration. The detents 58 occur at ninety degree intervals within the circular configuration of the receiving area. The annular lip 56 is in close juxtaposition with the end face 24 of the tubular section 14. End face 24 is shown as exposed to the open air. The tapered inner walls 18 are shown by the cross-hatching of FIG. 3. This taper extends downwardly to the opening 42 at the other end of anchor 10.

Figure 4:
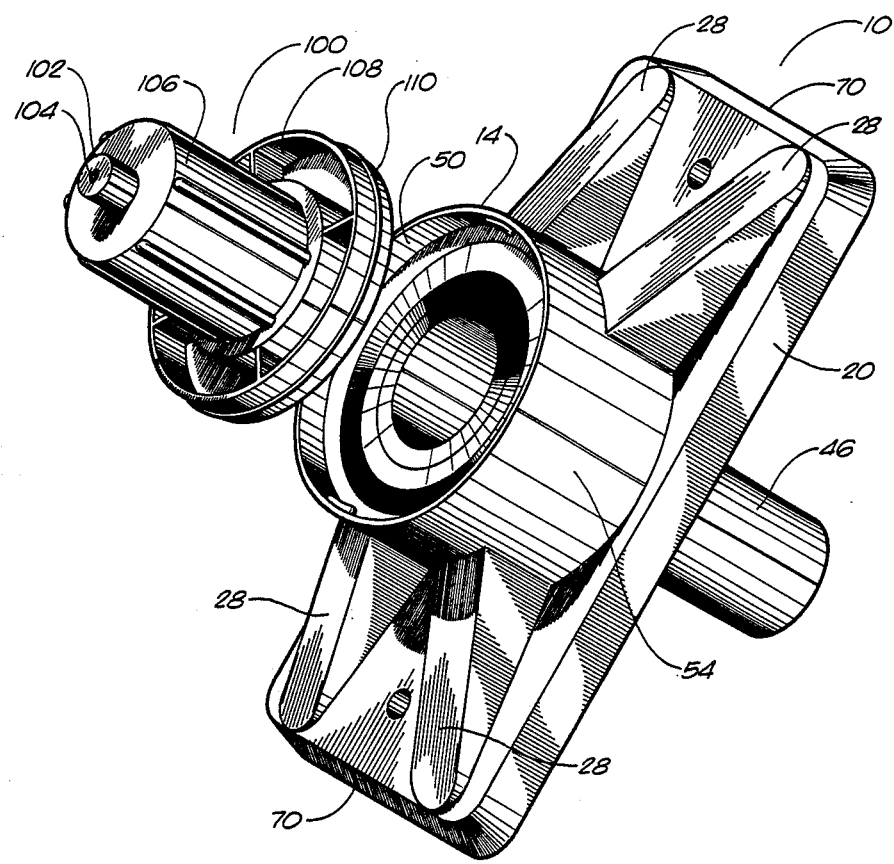
FIG. 4 is a perspective view of the anchor of the present invention as shown in position for receiving a sealing cap.

FIG. 4 shows the anchor 10 in perspective. Tendon tensioning anchor 10 is shown, in FIG. 4, as having the tubular member 46 extending upwardly to the base member 20. The plurality of reinforcing ribs 28 extend from the outer edge 70 to the tubular section 14. Tubular section 14 is encapsulated with a generally cylindrical plastic encapsulation 54. As seen in FIG. 4, sealing cap 100 in proper position for insertion into the receiving area 50 of the anchor 10. Sealing cap 100 includes a grease fitting 102. Grease fitting 102 allows grease to be installed into the interior of the sealing cap 100 so as to fill the void between the sealing cap 100, the tendon, and the interior of the anchor 10. Grease is pumped into the opening 104 on grease fitting 102 following the installation of the anchor. The extended cylindrical portion 106 extends from the circular exposed face 108. The cylindrical section 106 has a size suitable for receiving the tendon after the removal of the excess portion of the tendon. The circular face 108 includes a lip 110. Lip 110 is suitable for insertion within the receiving area 50 and retention within the detents 58 formed on the interior of the receiving area 50.

In normal operation, the anchor 10 is extremely useful in post-tensioning. During the process of post-tensioning, initially, holes are drilled into the form that retains the concrete. A pocket-former (of standard construction) is inserted into the receiving area 50 of the anchor 10. The endon is then passed through the pocket former and the anchor 10. The tendon thusly extends through the initial form. The tendon is then stressed to a desired amount so as to apply compression upon the form and the associated concrete. During tensioning, the wedges are placed within the sloping walls 18 of the base member 12. After tension is removed from the tendon, the return of the tendon will cause a wedging action which retains tension within the tendon and keeps the tendon from reducing tension. The excess remaining portion of the tendon is then removed by heating, cutting, sawing, or any other means. After cooling, the sealing cap 108 is placed over the receiving area 50 of the anchor 10. A grease gun is then used to introduce grease, or other liquids, into the interior of the sealing cap 100 and anchor 10. This process further protects the tendon and the anchor from exposure to corrosive elements.

Figure 5:
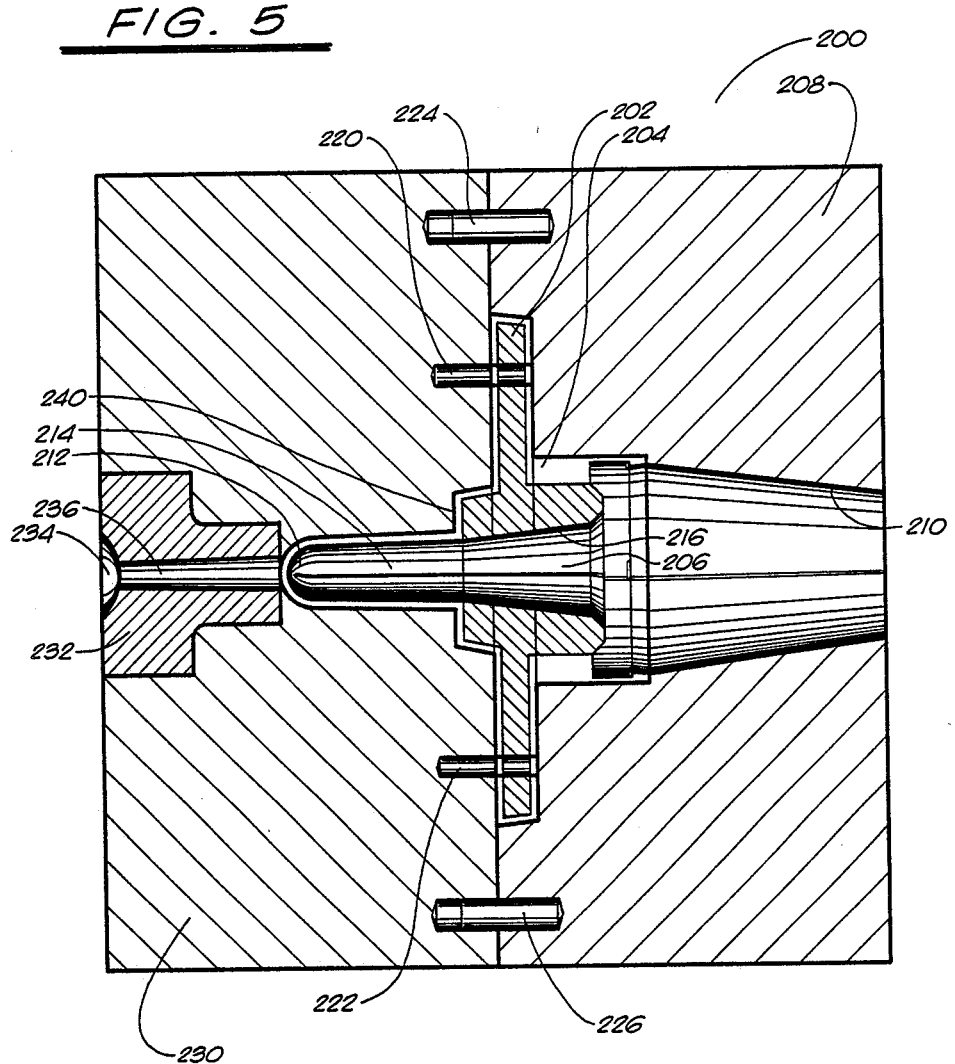
FIG. 5 illustrates the molding method in accordance with the preferred embodiment of the present invention.

The present invention is also an improved method of encapsulating a tendon tensioning anchor. FIG. 5 illustrates the method of the present invention. In FIG. 5, there is shown the complete mold 200 for the forming of the plastic encapsulation about the exterior of a standard tendon tensioning anchor 202. In the best mode of the present invention, this is a plastic injection molding process. Alternatively, however, the plastic encapsulation can be accomplished through the use of thermoplastic injection molding or by thermoset injection processes. These other techniques, importantly, will incorporate a similar method as does the present invention.

Initially, anchor 202 is loaded into the mold 200. The interior 204 of mold 200 defines the exterior shape of the plastic encapsulation. The anchor 202 is initially placed into position by sliding on to and centering upon mandrel 206. Mandrel 206 extends through the right-hand side 208 of mold 200. Mandrel 206 has a downwardly tapered wall 210 extending through mold half 208. Mandrel 206 extends outwardly to end 212. End 212 has a semi-spherical shape. From end 212, mandrel 206 has a solid cylindrical portion 214. A tapered area 216 follows this cylindrical section 214. This tapered section 216 matches the taper and size of the inner diameter 18 of the anchor 202.

After placing anchor 202 upon the mandrel 206, the anchor is secured in position by the appropriate placing of pins 220 and 222 in proper position. These pins 220 and 222 secure the anchor 202 in position with reference to the mold half 208. Additionally, pins 224 and 226 are inserted into their respective openings within mold half 208. Following the alignment of these pins and the proper positioning of the anchor 202, mold half 230 is placed in close juxtaposition and properly secured against mold half 208. In this configuration, the mold for the forming of the plastic encapsulation about anchor 202 is in proper condition.

Mold half 230 includes sprue bushing 232. Sprue bushing 232 has injection nozzle 234 extending therethrough. Injection nozzle 234 is positioned so as to communicate with the interior plastic encapsulation-forming area of the mold 200. The injection nozzle 234 allows liquid plastic to flow through opening 236 into the mold 200.

So as to form the plastic encapsulation, a liquid plastic is injected into nozzle 234, passes through opening 236, and into the form 240. When the liquid plastic passes into the form 240, it spreads through the open areas defined by the mold. In essence, this spreading allows the liquid plastic to cover the exterior surfaces of anchor 202. The liquid plastic is injected under high pressures. The plastic is high-density polyethylene. Under the preferred embodiment of the present invention, this high-density polyethylene is injected at 15,000 p.s.i. of injection pressure. This level of pressure eliminates the air pockets between the plastic encapsulation and the base member. It is important to note, however, that depending upon the process used for the injection and the encapsulating of the anchor, less pressure may be utilized or more pressure may be utilized in addition, the encapsulation could also be formed by vacuum technology or casting methods. It was felt important to eliminate the air pockets between the encapsulation and the anchor and to keep the layers in relatively air-tight juxtaposition. In one embodiment, this 7,500 to 15,000 p.s.i. of injection pressure was found suitable for such purpose.

It can be seen that the liquid plastic flows around the semi-spherical area of mandrel 206, through the passageways and toward the open area 204, defining the receiving area. The liquid plastic flow around the semi-spherical portion 212 and solid cylindrical portion 214 forms the tubular portion of the encapsulation. The filling of the area 204 forms the receiving area of the anchor of the present invention.

The injected plastic is allowed to solidify within the mold in the desired format. When the plastic solidifies, it tightens and securely covers the base member/anchor. Following solidification, the anchor is removed from the mold. After it is removed from the mold, the semi-spherical plastic portion, formed during the molding process over the end of the tubular section of the anchor, is trimmed so as to open the end of the tubular portion. After removal and trimming, the tendon tensioning anchor of the present invention is in proper condition for use.

The present invention offers a number of advantages over the prior art. The anchor of the present invention is completely encapsulated in a virtually air-tight manner in plastic. This encapsulation has high strength, excellent low temperature properties, and high chemical resistance. Unlike the prior art, the encapsulation is in a single unitary fashion. The present invention requires no assembly at the work place.

In manufacture, the present invention offers an anchor that does not require expensive machining, assembly, or manipulation. No grease is required between the anchor and the plastic encapsulation. This eliminates the possibility of air pockets and the necessity of costly assembling.

It is a common problem at the construction site that parts are lost, misplaced, undelivered, and otherwise absent. Many of the prior-art devices serving similar functions require the assembly of several parts. The mere fact of requiring several parts for assembly inherently means the loss of such parts at the job site, the ordering of additional quantities of parts, and difficulties in instruction, use, and organization. The present invention, having a unitary configuration, does not require additional parts, such as covers, or other components. The present invention achieves a savings in manpower and expense by offering this unitary configuration.

The method of the present invention can be used with any anchor design currently available on the market without modifications. A proper adjustment of the mandrel size and the location of the anchor within the mold allows the protective coating to be properly applied to various sizes of anchor.

Further and additional benefits of the present invention are gained by the fact that electrolysis will be allowed to occur, naturally, between the tendon and the anchor. It is believed that the electrolytic effects do not create additional corrosion in the anchor. It is believed that the electrolytic effects further enhance and strengthen the attachment forces between the tendon and the anchor.

Since the exterior of the anchor is completely sealed, there is no possibility of accidental infiltration by corrosive elements. The plastic encapsulation is of high strength so that it becomes very difficult to invade the protective environment of the encapsulation. It is believed that the encapsulation of the present invention will give the anchor a much longer life than the prior-art systems.

The foregoing disclosure and description of the invention is illustrative and explanatory thereof, and various changes in the method steps, as well as in the details of the illustrated apparatus, may be made within the scope of the appended claims, without departing from the true spirit of the invention. The present invention should only be limited by the following claims and their legal equivalents.

I claim:

1. A tendon tensioning anchor comprising:
   a base member having a tubular section extending therefrom, said tubular section having a sloping annular interior wall for receiving the end of a tendon; and
   a plastic encapsulation means in generally air-tight juxtaposition with the exterior of said base member and the exterior of said tubular section, said plastic encapsulation means comprising a plastic material of high density polyethylene in injection-molded relationship to said base member and said tubular section, said plastic encapsulation means being of unitary construction, said base member and said sloping annular interior wall of said tubular section being in with said tendon extending therethrough electrolytic contact.

2. The anchor of claim 1, said plastic encapsulation means opening at the end of said tubular section opposite said base member, said plastic encapsulation means exposing said sloping annular interior wall.

3. The anchor of claim 1, said plastic encapsulation means further comprising:
   a tubular portion formed at the side of said base member opposite said tubular section and extending outwardly perpendicular to the base member, said tubular portion having a diameter sufficient for receiving a tendon.

4. The anchor of claim 1, further comprising:
   a transition structure formed on the side of said base member opposite said tubular section, said transition structure having a narrowing interior bore concentric with said sloping annular interior wall of said base member, said plastic encapsulation means surrounding the exterior of said transition structure in a generally air-tight relationship.

5. The anchor of claim 1, said base member having a plurality of holes extending through the thickness of said base member, said plastic encapsulation means extending through said hole so as to seal the walls of said holes from the external environment.

6. The anchor of claim 1, said encapsulation means further comprising:
a receiving area formed adjacent the end of said tubular section opposite said base member and extending outwardly therefrom, said receiving area for the attachment of a sealing cap.

7. The anchor of claim 6, said receiving area comprising:
a cylindrical portion extending outwardly flush with the exterior surface of said plastic encapsulation means surrounding said tubular section;
an annular lip extending inwardly from the inner wall of said cylindrical portion, said lip in sealing relation with the end of said tubular section; and
a locking structure formed on the inner wall of said cylindrical portion for receiving a lip of said sealing cap.

8. The anchor of claim 1, further comprising:
a reinforcing rib member extending outwardly from the exterior of said tubular section to said base member, said plastic encapsulation means surrounding and in air-tight juxtaposition with said rib member.

9. An improved tendon tensioning anchor, the improvement comprising:
a plastic encapsulation material of high density polyethylene surrounding the exterior surface of said anchor, said plastic encapsulation material in injection molded relationship with said anchor, said plastic encapsulation material in air-tight juxtaposition with said exterior surface, said plastic encapsulation material of unitary construction, said anchor having an exposed interior area for electrolytic action with a tendon extending therethrough.

10. The improvement of claim 9, further comprising:
a tubular portion formed integral with said plastic encapsulation material and extending outwardly from said anchor, said tubular portion having a diameter sufficient for receiving a tendon.

11. The improvement of claim 10, further comprising:
a receiving area formed integral with said plastic encapsulation material and extending outwardly from the side of said anchor opposite said tubular portion, said receiving area for the attachment of a sealing cap.

12. The improvement of claim 11, said receiving area comprising:
a cylindrical portion extending outwardly flush with the exterior surface of said plastic encapsulation material;
an annular lip extending inwardly from the inner wall of said cylindrical portion, said lip in sealing relation with a portion of said anchor; and
a locking structure formed on the inner wall of said cylindrical portion for fixedly receiving a portion of a sealing cap.

* * * * *